United States Patent [19]

Pruvot et al.

[11] 3,709,093
[45] Jan. 9, 1973

[54] METHOD OF CUTTING GEAR TEETH OF HOMOKINETIC JOINTS OF HYDRAULIC PUMPS AND MOTORS

[76] Inventors: Francois C. Pruvot; Henri Poletti, both of 8/10 Avenue Emile Zola, Billancourt Hauts de Seine, France

[22] Filed: Nov. 9, 1970

[21] Appl. No.: 87,745

[30] Foreign Application Priority Data

Nov. 21, 1969 France..................................6940149

[52] U.S. Cl. ............................................................90/8
[51] Int. Cl. ......................................................B23f 9/04
[58] Field of Search..........................................90/7, 8

[56] References Cited

UNITED STATES PATENTS 579,708   3/1897   Fellows ........................................90/7

FOREIGN PATENTS OR APPLICATIONS 215,402   5/1924   Great Britain...............................90/8

OTHER PUBLICATIONS

A.P.C. Application of Fredericks, Ser. No. 392,532, published May 4, 1943.

Primary Examiner—Francis S. Husar
Attorney—Stevens, Davis, Miller & Mosher

[57] ABSTRACT

Method of cutting gear teeth having a convex working surface of a homokinetic joint, consisting in imparting to a multi-cutter tool a rectilinear reciprocating motion combined with a movement of rotation while the workpiece to be cut, mounted in a mandrel, rotates about its axis at a speed determined as a function of the movement of rotation of said tool, characterized in that the angle formed between the axes of rotation of the workpiece and of the tool is modified as well as the distance between the cutters and the workpiece, according to a law linking the momentary values of said angle and distance so that at any time the straight lines of intersection of the plane generated by the cutting edge during the reciprocating movement of one of the cutters of the tool with a plane parallel to the axis of rotation of the workpiece, which is fixed in relation to said workpiece, be tangent to a given curve of said plane parallel to the axis of rotation of said workpiece.

4 Claims, 11 Drawing Figures

METHOD OF CUTTING GEAR TEETH OF HOMOKINETIC JOINTS OF HYDRAULIC PUMPS AND MOTORS

The present invention relates to homokinetic joints interposed between two members to be rotated at equal speeds and likely to occupy variable or fixed positions with respect to each other.

A preferential field of application of these joints is that of high-pressure hydraulic pumps and motors, wherein the cylinder block and the power shaft have a certain constant or variable angular relationship. In these pumps and motors, frequently referred to as axial-piston or barrel-piston pumps and motors with broken axis, the cylinder barrel must revolve at the same speed as the driving shaft in order to ensure a proper oil distribution to the cylinders and avoid inertia effects of the barrel. Since the torques applied directly to the barrel are relatively low (because the power torque or reaction torque is applied directly to the pump driving shaft), the homokinetic joint according to this invention is particularly advantageous due to its reduced over-all dimensions and its relatively great torque absorption capacity.

Pumps are already known wherein the cylinder barrel is rotatably driven through a universal joint consisting of a small rod carrying pivoted trunnion-blocks slidably engaging grooves formed in the pump shaft and in the barrel, respectively. This coupling is attended by several inconveniences, inter alia:

a very high cost due to its considerable number of parts and to the relatively close machining tolerances required therefor;

a low torque transmitting capacity, likely to entail premature wear and seizing if, for some unknown reasons, the torque to be transmitted became greater than the rated torque;

the absence of true homokinetism. In fact, it is known that this joint is homokinetic only in two positions; firstly, when the angle formed between the barrel axis the pump shaft is zero, and when the angle between the small rod and the pump shaft is equal to the angle between the small rod and the barrel axis. Since this last-mentioned angular position or relationship is dependent on the axial position of the small rod, it is clear that the greater the discrepancy from the position giving the required angular equality, the higher the torque due to the barrel inertia given for a constant shaft speed. This effect is all the more detrimental as the pump (or motor) speed is higher.

It will be noted that these inconveniences are also observed when the barrel is driven through universal joints.

To cope with the absence of homokinetic operation of these joints, pumps have already been constructed wherein the barrel is driven through a three-armed or tripod joint; however, this arrangement described notably in the U.S. Pat. Nos. 3,289,604 and 2,956,508 does not eliminate the other inconveniences set forth hereinabove. To simplify the aforesaid couplings joints have been proposed which comprise an external member of substantially part-spherical configuration, formed with internal grooves and rigidly secured through a support to the barrel end, and an internal member of substantially part-spherical configuration, formed with external grooves and secured to an extension of the pump driving shaft, said members being drivingly interconnected through balls movable in said grooves. A joint of this character, described in the French Pat. No. 1,242,465 is adapted to provide a homokinetic coupling between the driving shaft and the pump barrel, irrespective of the angle formed by the broken axis. The chief advantage deriving from the use of this coupling is the presence of a single joint. However, the center of the joint must lie at the same time on the axis of rotation of the barrel support, the barrel axis and the pump shaft axis. Under these conditions it is obvious that the construction of pumps utilizing this type of joint is excessively elaborate, and furthermore this arrangement is not applicable to small pumps for in this case the manufacture of a joint of this type is extremely delicate.

In other pump types the barrel is driven through the piston rods. This arrangement is attended by a number of technological inconveniences for it involves an increment in the piston weight and an elongation of the barrels. Since the driving torque is transmitted via the pistons, these are subjected to a rocking torque causing a detrimental increase in the piston and cylinder wear. Moreover, difficulties are experienced for assembling the connecting-rod and piston units.

Other known pump types comprise bevel gears for driving the barrel, but this very cumbersome arrangement is applicable only to constant cylinder-capacity pumps.

It is also known through the U.S. Pat. Nos. 3,013,411 and 3,192,868 to provide on a pump shaft an externally toothed ring engaging a socket or sleeve rigid with the barrel and formed with internal teeth or splines.

The socket teeth like the shaft teeth are of the double helical type in that each tooth has a volume common to the teeth of two identical helical gears wherein the inclinations of the helices have opposite directions. This arrangement provides a substantially homokinetic coupling, even in case relatively wide angular movements between the pump shaft and the barrel axis are contemplated. However, machining the necessary internal and external splines is an extremely difficult operation for cutting interferences produce in the middle plane of the teeth a sharp edge providing only a point contact between the teeth of the ring and socket respectively. Since the radius of curvature of the outline is zero at the point of contact, it is clear that the torque transmission capacity of this arrangement is relatively low.

In addition to this major inconvenience, it will be seen that the drive cannot take place without a considerable play if the socket has spur teeth. This inconvenience may become extremely detrimental if the torque applied to the socket or to the piston rod is subjected to direction reversals (although this is precluded in the case of hydraulic pumps or motors).

Although the necessity of connecting the two helical surfaces through a rounded surface can be foreseen, so far as the Applicants are aware neither this surface nor the method of obtaining same have never been clearly proposed.

Methods of cutting gears by using Fellows machines are well known in the art. According to these methods, the gear blank is clamped in a rotating mandrel and the cutter comprising a number of tools is disposed on an axis parallel to the blank axis. The speed ratio between the rotating workpiece and the cutter is the reverse of the ratio of the teeth number of the workpiece to that of the cutter. The cutting tool is also reciprocated along its axis of rotation.

At the beginning of the cutting operation the distance between the cutter and the blank is such that there is no contact between the workpiece and the cutter. After the assembly is started, the axes of rotation of the blank and tool are moved towards each other and when the final cutting diameter is obtained the cutter and gear are moved away from each other, and another cutting operation may be started with another workpiece.

The same procedure may be adhered to for cutting helical gears. In this case a helical motion is imparted to the cutter-supporting spindle. Obviously, this method is also applicable to the cutting of a coupling comprising teeth of the double helical type. In fact, it is only necessary to mount the workpiece in succession in two machines adapted to cut helical gears with helix angles of opposite directions. In this case the resulting coupling would have the above-mentioned sharp edge limiting its capacity. It will be seen that this sharp edge is the only part engaging the internally splined member of the universal joint, for the angle of the helix cut in the rod will have to be slightly greater than the maximum angle of operation of the universal joint in order to avoid interferences and "heelings" between the two members. To avoid this inconvenience, the Applicants found that it was only necessary to substitute a spur cutting operation, which can be performed on known machine of the Fellows type, for the double helical cutting of one of the joint members, and then, still on the same machine, to simply gradually increase the inclination of the cutter-supporting spindle in relation to the workpiece-supporting mandrel while modifying the distance between the workpiece to be cut and the cutting tool. The Applicants also discovered that the law linking the inclination and the relative distance between the cutter and workpiece permitted the machining of a tooth flank on the universal joint member, of which all the radii of curvature have predetermined values and will afford a good load capacity in actual service.

More specifically, it will be possible to choose a law of variation of the distance from the cutter to the axis of the small rod such that the curve of intersection of an arbitrary plane parallel to the rod axis with the flank of the cut tooth be a circle. It may thus be proved that the outlines of the tooth flanks for all the planes parallel to the arbitrary plane mentioned hereinabove also consist of circles. Thus, for instance, if a plane normal to the tooth surface is selected, it is possible to obtain a tooth working flank such that its main radii of curvature remain constant, or in other words that for a given torque applied to the coupling the hertzian stress will be practically constant and independent of the angle of operation. In fact, the other main radius of curvature will consist of the curvature generated by the flank of the cutter tool to which any desired radius of curvature may be given.

It is clear that this homokinetic joint can operate only with play, whenever the angle of operation departs from the maximum cutting angle (in which case there is no play). Now this play is not objectionable per se, inasmuch as due account is taken thereof for the fluid distribution of the hydraulic motor or pump.

From the foregoing it will be clearly apparent that the essential object of this invention consists in providing a method of manufacturing this joint and more particularly of machining the working surface of the tooth outline of one of the coupling members.

It is another object of this invention to provide a tooth surface shape having a satisfactory strength under normal stress conditions together with a good torque transmitting capacity while ensuring a homokinetic drive throughout the range of the angular values obtained during the operation of the pump or motor.

It is a complementary object of this invention to provide a method of cutting internal teeth in a sleeve or external teeth in the head of the rod transmitting the rotational drive from the pump shaft to the barrel.

The method of cutting gear teeth having a convex working surface in a member of homokinetic joint, which consists in imparting to a tool having movable cutters a rectilinear reciprocating motion combined with a movement of rotation, while rotating about its axis the workpiece to be cut, as the latter is mounted in a mandrel, at a speed determined in function of the tool rotation, is characterized in that the angle between the axes of rotation of the workpiece and tool as well as the distance between the cutter and the workpiece to be cut are modified according to a law so linking the momentary values of said angle and distance that at any time the straight lines of intersection of the plane generated by the cutting edge, during its reciprocating movement, of one of the tool cutters, with the plane parallel to the axis of rotation of said workpiece, which is fixed in relation to said workpiece, be tangent to a given curve of said plane parallel to the axis of rotation of said workpiece.

Other features and advantages of this invention will appear as the following description proceeds with reference to the attached drawing, in which.

Figure 1:
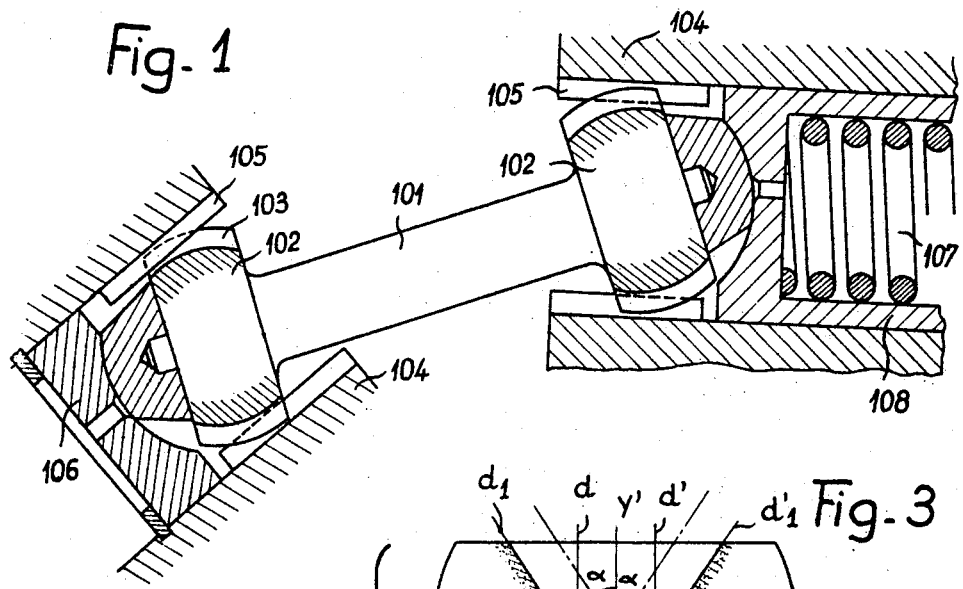
FIG. 1 shows a homokinetic joint in its operative position in a hydraulic pump or motor.

Referring firstly to FIG. 1 the homokinetic joint or coupling shown therein comprises in the known fashion a rod 101 having enlarged end portions or heads 102 each provided with teeth 103 constituting splines having a particular shape. Each rod end 102 is adapted to drive an internally splined socket 104, of which the teeth 105 match those of rod 101. Of course, this homokinetic joint may comprise if desired a single splined socket and the externally splined member, if the relative angular excursion of the socket and rod is relatively reduced. The rod is maintained in its axial position with the assistance of a fixed part-spherical abutment member 106 which it engages with one end, its opposite end receiving the resilient pressure of a coil compression spring 107 through the medium of an axially movable socket 108 holding the rod head 102 in engagement with the corresponding part-spherical abutment member 106.

Figure 2:
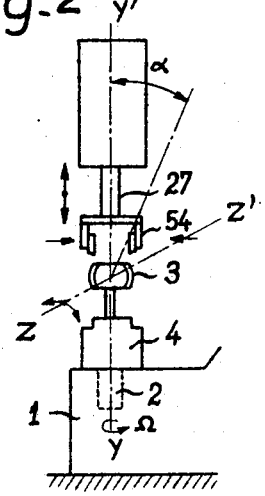
FIG. 2 is a diagrammatic view of the main component elements of the cutting machine utilized for carrying out the method of this invention.

FIG. 2 illustrates the diagram of a machine permitting of cutting teeth in the rod head described hereinabove. This machine comprises essentially a frame structure 1 receiving therein a vertical rotary spindle 2 driving a mandrel 4 at a speed $\Omega$ about the axis $yy'$. A cutting tool consisting of a number of cutters 54 corresponding to the number of teeth to be cut in the rod head 3, is rigid with another spindle 27 revolving at the same speed as the workpiece-supporting spindle 2.

At the beginning of the cutting operation the tool axis merges with the axis of rotation $yy'$ of rod 3. The spindle 27 is also reciprocated along its axis of rotation. During their rotation, the tool cutters 54 are moved towards the axis of rotation of the workpiece until teeth are cut in the rod head. Then while the spindles 2 and 27 continue to revolve at said speed the axis of the tool-carrying spindle 27 is inclined by an angle $\alpha$ (slightly greater than the maximum angle of operation of the universal coupling) about the axis $zz'$ perpendicular to axis $yy'$ and passing through the center of the rod head to be cut.

Figure 3:
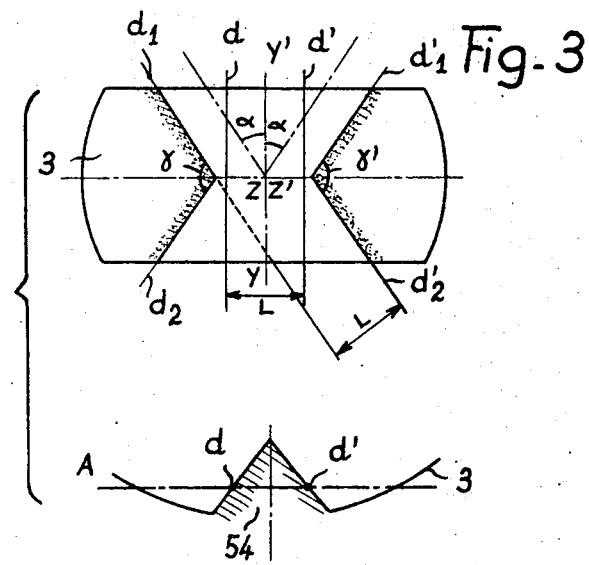
FIG. 3 is a diagram showing a tooth cut with a fixed distance between the tool and workpiece.

The result of this cutting operation is shown in the diagram of FIG. 3. Let us assume that A is a plane parallel to the rod axis $yy'$ which intersects the side faces or flanks of the teeth cut according to the traces $d$ and $d'$ left by the tool 54 at the end of the tool "contraction," just before the spindle 27 has been pivoted about the axis $zz'$.

It will be seen that when the spindle 27 has completed its pivotal movement through an angle $\alpha$ about the axis $zz'$, the aforesaid traces $d$ and $d'$ are replaced by other traces $d_1$, $d'_2$ and $d'_1$, $d_2$. Under these conditions it is clear that nothing is left of the initial traces $d$ and $d'$ and that the cut teeth comprise sharp edges $\gamma$, $\gamma'$.

Figure 4:
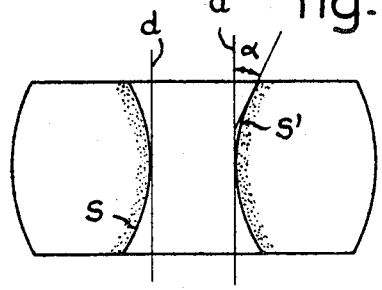
FIG. 4 is another diagram showing a tooth cut according to the method of this invention.
Figure 5:
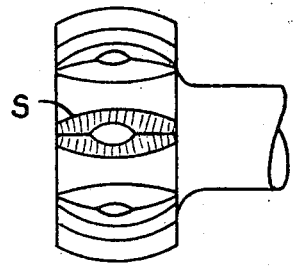
FIG. 5 is a front view of a rod head in which teeth have been cut according to the teachings of the method of this invention.

FIG. 4 shows clearly the essential object of this invention in that the procedure to be adhered to for obtaining a rounded surface in lieu of said sharp edge is obvious from this Figure.

Let $d$ and $d'$ be the traces of the tool cutter in the plane parallel to the axis of rotation of the workpiece at the end of the cutting operation (when the axes of spindles 2 and 27 are merged into one). Let also S and S' be predetermined curves in this plane, which are tangent to the straight lines $d$ and $d'$. Whatever the inclination $\alpha$ of the upper spindle 27, the trace of the cutting edge of tool 54 in the plane parallel to said axis of rotation of the workpiece may still be tangent to curves S and S'. This requirement can be met by simply using a predetermined tool spacing for each value of the angle of inclination $\alpha$. It will thus be seen that the universal joint is homokinetic, irrespective of the angle between socket and rod, for the joint comprises a cylindrical socket 104 formed with internal teeth, and a rod head 102 having external teeth the outline of which corresponds to the above-defined characteristics, the play between said rod and socket causing an angular shift between the two members; now this shift depends on the angle formed between the rod axis and the axis of the internally splined socket.

The following descriptions given by way of example refer to two arrangements conforming to the above-described method. Of course, these descriptions should not be construed as limiting the present invention for those skilled in the art may easily use other combinations of elementary mechanisms leading to the same result.

It may be noted in particular that the cutter tool described hereinabove may be replaced by other tools designed for carrying out electrical, electro-chemical and other machining processes.

Figure 6:
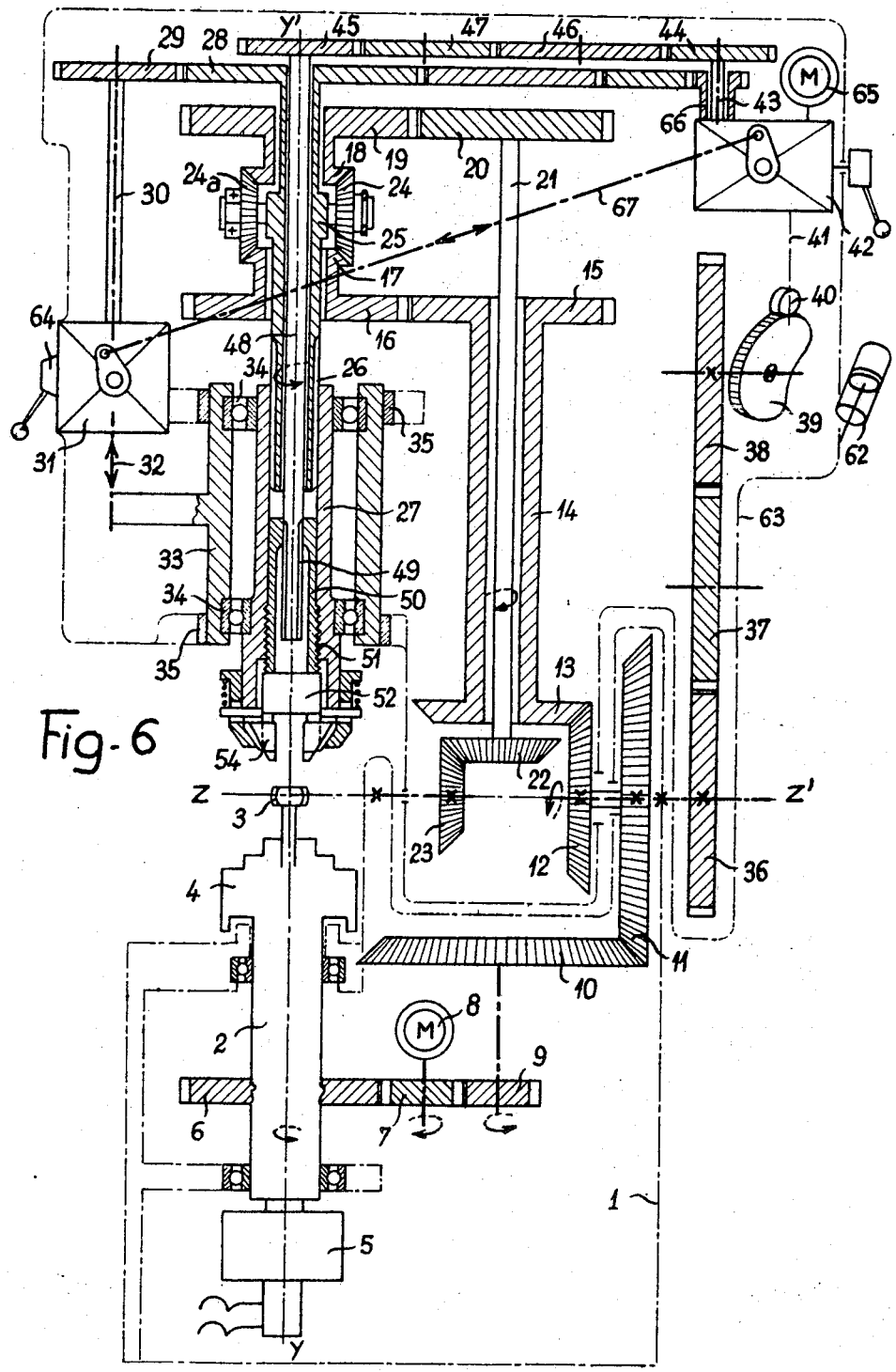
FIG. 6 is a fragmentary and diagrammatic view showing in vertical section a kinematic arrangement suitable for carrying out the method of this invention.

Referring to FIG. 6, the cutting machine comprises a fixed frame structure 1 in which the workpiece holding spindle 2 is rotatably mounted; this spindle 2 carries the workpiece 3 by means of a mandrel 4 responsive to a workpiece clamping device 5 preferably of hydraulic or pneumatic type so that the various steps of the process can take place automatically.

The spindle 2 has keyed thereon a pinion 6 driven from a toothed wheel 7 mounted to the end of the shaft of an electric motor 8.

The toothed wheel 7 also drives a pinion 9 rigid with a bevel wheel 10 meshing in turn with a companion bevel wheel 11 rotatably rigid with a bevel pinion 12 meshing with a bevel pinion 13 driving through a hollow shaft 14 a spur pinion 15 meshing with a pinion 16 rotatably rigid with the sun bevel pinion 17 of a differential. The other sun pinion 18 of this differential is rotatably solid with a spur gear 19 meshing with a gear 20 keyed to one end of a shaft 21 coaxial to the hollow shaft 14 and carrying at its other end a bevel pinion 22 meshing with a bevel pinion 23 rotatably solid with the frame structure 1. It will be noted that the ratio provided by bevel pinions 22, 23 must be the same as that of bevel pinions 13, 12. The planetary pinions 24, 24a of the differential are rigid with a vertical hollow shaft 25 carrying at its lower end outer splines 26 slidably engaged without any angular play in the correspondingly splined upper portion of the tool holding spindle 27. At its upper end the shaft 25 carries a spur pinion 28 meshing with another pinion 29 rigid with a shaft 30 parallel to shaft 25 and driving a mechanism enclosed in a case 31. This mechanism provides through an output shaft shown diagrammatically at 32 a reciprocating motion applied to the sleeve 33 in which the toolholder spindle 27 is rotatably mounted through the medium of ball-bearings 34. This sleeve 33 is adapted to slide freely in plain anti-friction bearings 35.

A spur pinion 36 is mounted to a shaft rigid with the frame structure 1 and drives through the medium of a counterpinion 37 a pinion 38 rotatably rigid with a cam 39. This cam 39 is engaged by a roller follower 40 rigid with a rod 41 leading to a case 42 not described herein since its construction is conventional in the art. The function of this case 42 will be described presently.

Figure 7:
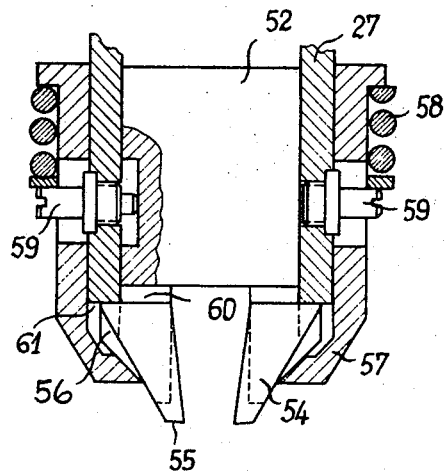
FIG. 7 is a detail view showing in axial section details of a tool holder suitable for use in the arrangement of FIG. 6.
Figure 8:
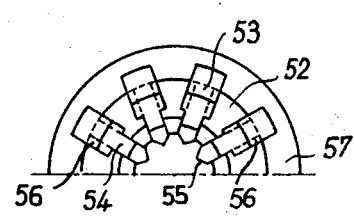
FIG. 8 is a half-view from beneath of the tool holder.
Figure 9:
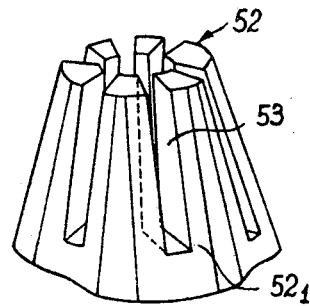
FIG. 9 is a perspective view of the slide, showing one of the bearing faces engageable by the tool heel.

From this case 42 emerges an output shaft 43 rotatably driving a pinion 44 driving in turn another pinion 45 through counter-pinions 46 and 47. Pinion 45 is keyed to the upper end of shaft 48 concentric to the tool-holder spindle 27. The shaft 48 has its lower end splined 49; this end is slidably engaged, without any angular play, in a screw-threaded member 50 adapted to be screwed through threads 51 in the tool-holder spindle 27. This screw-threaded member 50 bears upon a slide 52 slidably mounted without play in the spindle 27 and comprising at its end radial slots or notches 53 (FIGS. 8 and 9) corresponding in number to the teeth to be cut. Each slot 53 has mounted therein a movable cutter 54 having a cutting edge 55 and a heel 56 enabling the cutter 54 to bear against the slide 52. A ring 57 formed with an internal taper (FIG. 7) engages all the heels 56 of cutters 54 and holds them in engagement with the spindle 27 and also with the face $52_1$ of slide 52. The ring 57 sliding along the spindle 27 is urged towards the tool heels 56 by a spring 58. The slide 52 is held against rotation in relation to the spindle 27 by studs 59 rigid with said slide and adapted to guide the ring 57.

Finally, it will be seen that one face 60 of tools 54 is adapted to bear against the end 61 of spindle 27.

A motor 62 illustrated in FIG. 6 in the form of a hydraulic actuator is coupled to a movable frame structure 63 adapted to pivot with respect to the fixed frame structure 1 of the machine along an axis $zz'$ perpendicular to the axis $y-y$ of spindle 2 (and therefore to the axis of rod 3), said axis passing through the center of the rod head 3.

The movable frame structure 63 comprises all the member required for controlling the tool-holder spindle 27 and the tool proper.

The machining process comprises the following steps. At the beginning of the cutting operation a rod blank is positioned in the mandrel 4 and the latter is clamped; the motor 8 rotatably drives the mandrel 4 and the driving shaft driving in turn the kinematic chain comprising the members 7, 9, 10, 11, 12, 13, 15, 16, 17, 24, 25, 26 and spindle 27. The gear ratios are such that the spindle 27 and mandrel 4 revolve at exactly the same speed. Pinion 28 meshes with pinion 29 driving the mechanism enclosed in case 31 and not described herein, the function of this mechanism consisting in converting the movement of rotation into a periodic movement of translation of shaft 32. Thus, this shaft 32 will perform reciprocating sliding movements the frequency and amplitude of which can be adjusted by means of a manual control 64 provided on the case 31. The shaft 32 will thus impart a reciprocating motion to sleeve 33; in other words, the spindle 27 will receive a rectilinear reciprocating movement enabling the tools 54 to cut the workpiece 3.

Meanwhile another motor 65 drives through a kinematic chain comprising pinions 44, 47, 46 and 45 the shaft 48 for causing the screw-threaded member 50 to revolve in relation to spindle 27. In fact, a differential (not shown) disposed within the case 42 is driven through a kinematic chain extending from pinion 28 to a pinion 66 whereby when the motor 65 is stopped, the spindle 27 and shaft 48 revolve at the same speed. When this motor 65 is energized, member 50 is moved axially within the spindle 27 due to the presence of screw-threads 51 and causes a backward movement of tools 54 (if member 50 rises) which are held by their heels 56 on slide 52 through the medium of ring 57.

When the root dimension or diameter of the spline teeth is attained, the motor 65 is stopped and the other motor 62 is started for inclining the spindle 27 in relation to spindle 2 while the reciprocating motion of sleeve 33 is continued.

During the pivotal movement of the movable frame structure 63, pinion 36 causes the cam 39 to rotate; this cam, through the medium of the driven shaft comprising members 40, 41, 43, 44, 47, 46, 45, 48, 27 controls the relative distance of tools 54 according to a law depending on the contour of said cam 39. This cam 39 will be so designed that the law governing the backward movement of the tools as a function of the angular movement of said movable frame structure will give the convex shape described hereinabove. This evidences the role of kinematic chain 23, 22, 20, 19, 18 which prevents the spindle 27 from undergoing a phase-displacement in relation to spindle 2 as the angular movement of frame structure 63 takes place.

Also obvious is the necessity of providing a coupling 67 between the cases 31 and 42 in order to transform the continuous motion of motor 65 into an intermittent movement of adjustment of the tools by means of shaft 48. In fact, it is necessary that the diametral adjustment takes place only when the tool is at its upper dead center, that is, clear of the workpiece to be cut, in order to avoid any heeling of the tool.

To this end, the cam 39 controls the roller 40 and its rod 41 so as to set a spring (not shown) without rotating the pinion 44. When the tool is in its top dead center position the coupling member 67 releases a trigger permitting a sudden rotation of pinion 44 and therefore of member 50, and consequently the movement of the tool cutters away from one another. Moreover, the coupling system 67 permits an additional increment in the relative distance of the cutters in the bottom dead center position of the tool to prevent the latter from heeling during the return stroke.

Of course, many other forms of embodiment of this machine may be contemplated by those skilled in the art, notably in connection with the retractable cutter tool and the means for controlling the inclination of the movable frame structure.

Thus, for instance, the train of pinions 10, 11, 12, 13, 23, 22 and differential 17, 18, 24, 24a may be replaced by a transmission comprising a shaft and homokinetic joints.

Figure 10:
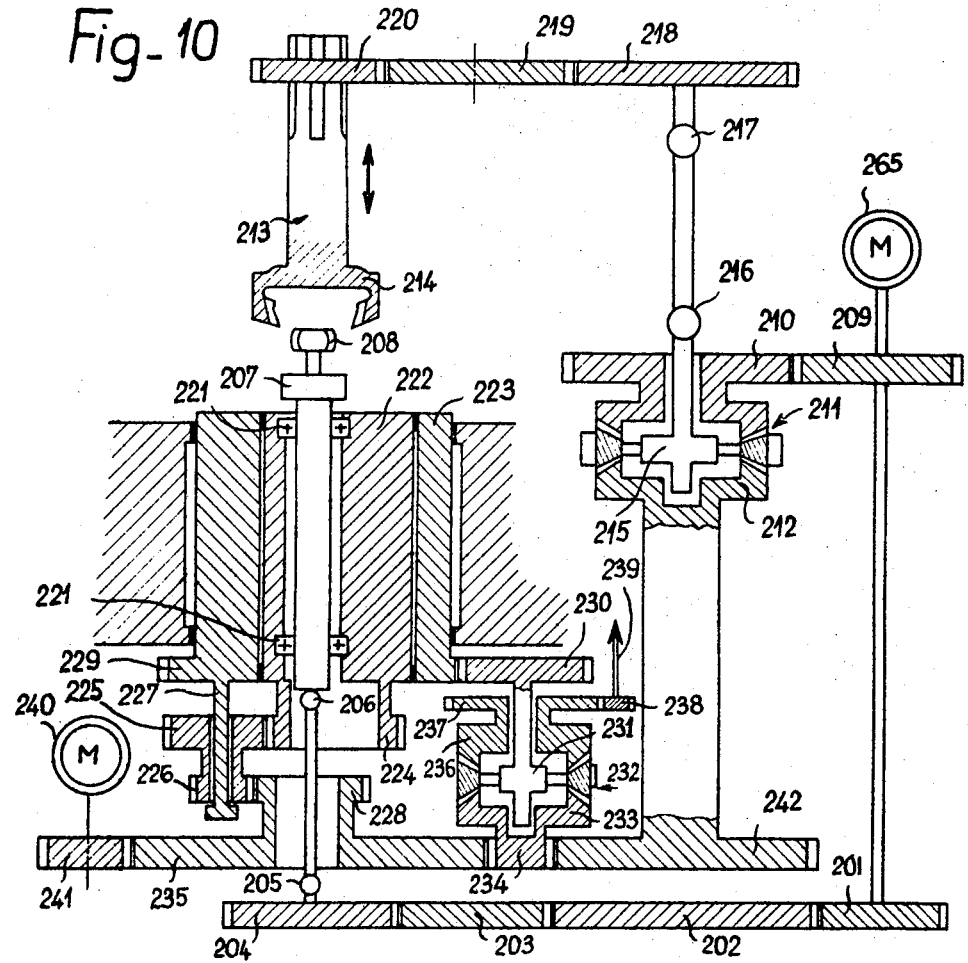
FIG. 10 illustrates a modified form of embodiment of the device shown in FIG. 6.

According to a modified form of embodiment of the device for carrying out the method of this invention, and as shown in FIG. 10, the retractable-cutters tool 54 may be replaced by a tool 213 comprising fixed cutters 214.

This tool is reciprocated along its axis but is not retractable; it is the workpiece 208 that, during its rotation, will become gradually more eccentric in relation to the tool.

The workpiece 208 is rotated at an angular speed $\omega_1$ and the cutter at an angular speed $\omega_2$ such that $\omega_1/\omega$ $r=n_2$, wherein $n_2$ is the teeth number of the cutter and $n_1$ the teeth number of the workpiece.

Figure 11:
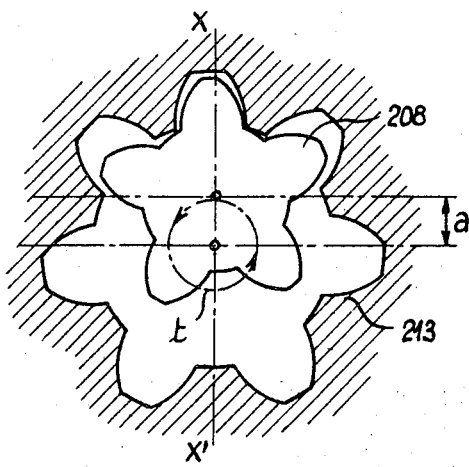
FIG. 11 illustrates a relative position of the tool and workpiece in the case of the device shown in FIG. 10.

To cut the workpiece, it is known to increase the throw $a$ (FIG. 11) while the axes of the cutter and workpiece are parallel. When the spline dimension is attained, the eccentric shift is discontinued and the spindle 213 holding the cutter 214 is gradually inclined in relation to the axis of the workpiece being cut. As this inclination increases, the throw $a$ is reduced according to the above-defined law, in order to generate the teeth convexity. However, this procedure is not sufficient for generating the teeth, for the theoretical point of contact between the cutter and workpiece still lies on the axis $x-x'$. Therefore the teeth thus cut will not meet the above-defined requirements. To meet these requirements it will be necessary to cause the cut splines to follow an orbit in relation to the tool. This orbital movement is shown by the dash and dot circle $t$ in FIG. 11 and followed by the center of the workpiece. In this manner the point of contact between the cutter and the workpiece will describe the complete pitch circle of the cutter. In fact, this hypocycloidal movement will be of complex nature for the path followed by the center of the workpiece will have a radius variable as a function of the inclination of the cutter-holding spindle, and will permit the disengagement or clearance of the tool during its return stroke to avoid any frictional contact between the cutting edge and the workpiece.

This method may be carried out by using several mechanisms of which a typical example will now be described in detail.

The mechanism for driving the cutter-holding spindle and the workpiece-holding spindle comprises an electric motor 265 driving through pinions 201 to 204 and homokinetic joints 205 and 206 the workpiece spindle 207 to which the workpiece 208 to be cut is secured by means of suitable members (not shown).

The same motor 265 drives through the medium of pinion 209 the planet wheel 210 of a differential 211 whereby when the other planet wheel 212 is still the cutter holding spindle 214 is driven through the kinematic chain 215, 216, 217, 218, 219 and 220 in the same direction as the workpiece-holding spindle 207 and at an angular speed $\omega_2$ such that $$\omega_2/\omega_1 = n_1/n_2$$

wherein $\omega_2$ is the speed of the cutter-holding spindle 213;
$\omega_1$ is the speed of the workpiece-holding spindle 207;
$n_1$ is the teeth number of the workpiece 208 to be cut, and
$n_2$ is the teeth number of cutter 214.

The manner in which the planet wheel 212 of the differential is driven will be described in detail presently. By virtue of the homokinetic joints 205, 206 the speed and phase relationships of the cutter-holding spindle 213 and workpiece-holding spindle 207 are maintained irrespective of their relative movements.

The spindle 207 is mounted in bearings 221 mounted in turn in an intermediate sleeve 222 fitted in a drive sleeve 223. The eccentric relationship between the various component elements 207, 222 and 223 are such that in a given position the axis of spindle 207 will be more or less eccentric in relation to sleeve 223. The intermediate sleeve 222 is rigid with a gear 224 meshing with the pinion 225 rigid in turn with another pinion 226. The pinions 225 and 226 are mounted for loose rotation on a shaft 227 solid with, but eccentric in relation to, the driving sleeve 223. Pinion 226 is in meshing engagement with another pinion 228 having its axis coincident with that of said sleeve 223, and it will be assumed that during at least one moment pinion 228 is fixed. On the other hand, a toothed ring 229 rigid with sleeve 223 is driven by a pinion 230 driven in turn by the planetary pinion carrier 231 of a differential 232. A sun wheel 233 of this differential is rigid with a pinion 234 meshing in turn with a pinion 235 rigid with pinion 228 assumed to be fixed in the foregoing. The other sun wheel 236 is rigid with a pinion 237 driven in turn by a pinion 238 carried by a shaft 239. Thus, it is clear that the rotation of shaft 239 and pinion 238 causes the rotation of ring 229 and sleeve 223. In this case, and the calculations necessary for proving this are easily done, since the pinion 228 is assumed to be fixed, the gears 226, 225 and 224 can be so selected that the spindle 207 will assume an eccentric position, its path being a fixed straight line passing through the center of sleeve 223 and therefore through the cutter axis.

Under these conditions, the manner in which the cylindrical cutting of the workpiece 208 can be performed has been illustrated. Likewise, it will be seen that if the shaft 239 of pinion 238 is controlled by means of positive or negative impulses when the cutting tool 213 is at its top dead center and bottom dead center the chip removal and the tool disengagement will take place during the return stroke of said shaft.

Now the manner in which the cycloidal orbital movement of the workpiece, and therefore of the workpiece holding spindle 207, is obtained will be explained in detail.

In the foregoing, when the pinion 228 is fixed, the center of workpiece 208 describes a fixed straight line; in other words, the relative positions of cutter 213 and workpiece 208 remain unchanged.

A motor 240 coupled to a pinion 241 may be used for driving the planet wheel 233 of differential 232 through the kinematic chain comprising members 241, 235, 234. The driving shaft consisting of the kinematic chain comprising pinions 241, 235, 234, 233, 230 and 229 is so calculated that when shaft 239 is stationary the motor 240 can drive pinion 228 and toothed ring 229 at the same speed and in the same direction. In this case all the action exerted on shaft 239 will result in a modification of the throw or eccentric position of workpiece 208 without changing its phase.

In fact, adding a hypocycloidal movement to the workpiece 208 as defined by the path $t$ of its center, will change its relative position with respect to the cutter 214. Under these conditions a speed proportional to the velocity at which the center of the workpiece 208 is driven must be added to the cutter speed in order to keep the relative positions unchanged. Pinion 242 driving the planet wheel 212 permits of adding this speed.

The other functions of the machine such as workpiece feed, inclination of the cutter-holding spindle carrier frame structure, tool disengagement, chip removal, are similar to those described hereinabove.

The above description discloses with reference to the attached drawing the method of cutting a coupling comprising external convex teeth. It will readily occur to those skilled in the art that it would not constitute a departure from the spirit and scope of the invention to apply the same process to the cutting of couplings comprising internal convex teeth.

What is claimed as new is:

1. Method of cutting gear teeth having a convex working surface of a homokinetic joint, consisting in imparting to a multi-cutter tool a rectilinear reciprocating motion combined with a movement of rotation while the workpiece to be cut, mounted in a mandrel, rotates about its axis at a speed determined as a function of the movement of rotation of said tool, characterized in that the angle formed between the axes of rotation of the workpiece and of the tool is modified as well as the distance between the cutters and the workpiece, according to a law linking the momentary values of said angle and distance so that at any time the straight lines of intersection of the plane generated by the cutting edge during the reciprocating movement of one of the cutters of the tool with a plane parallel to the axis of rotation of the workpiece, which is fixed in relation to said workpiece, be tangent to a given curve of said plane parallel to the axis of rotation of said workpiece.

2. Method of cutting gear teeth having a convex working surface of homokinetic joint according to claim 1, consisting in utilizing a tool comprising radially movable cutters and rotating the workpiece to be cut about its axis at the same speed as the movement of rotation of said tool, characterized in that the distance between said cutters and the workpiece to be cut is subordinate to the relative spacing of the movable cutters of said tool, said spacing varying jointly with the angle formed between the convergent axes of rotation of said workpiece and tool according to a law linking the momentary values of said angle and spacing.

3. Method of cutting gear teeth having a convex working surface of a homokinetic joint according to claim 1, which consists in utilizing a tool comprising cutters fixed in relation to the tool body, and rotating the workpiece to be cut about its axis at a speed such that the ratio of the angular speed of the workpiece to be cut to the angular speed of the cutter be equal to the reverse of the ratio of the number of teeth of said workpiece to that of said cutter, characterized in that said distance between the cutters and the workpiece is dependent on the distance between the workpiece axis and the tool axis, according to a law linking the momentary values of said angle and distance.

4. Method of cutting gear teeth having a convex working surface of a homokinetic joint, according to claim 3, characterized in that a cycloidal motion is imparted to said workpiece and such that the axis of the base circle and the tool axis be convergent.

* * * * *